US012748897B2

(12) United States Patent
Li et al.

(10) Patent No.: US 12,748,897 B2
(45) Date of Patent: Sep. 29, 2026

(54) SYSTEM AND METHOD FOR DYNAMIC PRIVACY FILTER

(71) Applicant: Lenovo (Singapore) Pte. Ltd., Singapore (SG)

(72) Inventors: Scott Li, Cary, NC (US); Robert J Kapinos, Durham, NC (US); Robert James Norton, Jr., Raleigh, NC (US); Igor Stolbikov, Apex, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 82 days.

(21) Appl. No.: 18/797,734

(22) Filed: Aug. 8, 2024

(65) Prior Publication Data

US 2026/0044634 A1 Feb. 12, 2026

(51) Int. Cl.

| | |
|---|---|
| ***G06F 21/84*** | (2013.01) |
| ***G06F 3/01*** | (2006.01) |
| ***G06F 3/0346*** | (2013.01) |
| ***G06F 3/14*** | (2006.01) |
| ***G06F 21/60*** | (2013.01) |

(52) U.S. Cl.

CPC .............. *G06F 21/84* (2013.01); *G06F 3/013* (2013.01); *G06F 3/0346* (2013.01); *G06F 3/1446* (2013.01); *G06F 21/604* (2013.01)

(58) Field of Classification Search

None

See application file for complete search history.

(56) References Cited

U.S. PATENT DOCUMENTS

| | | | | |
|---|---|---|---|---|
| 9,311,496 | B1 * | 4/2016 | Dutch | G06F 21/604 |
| 9,746,941 | B2 * | 8/2017 | Raffa | G06F 1/1694 |
| 10,162,974 | B2 * | 12/2018 | Liu | G06F 21/84 |
| 10,585,277 | B2 * | 3/2020 | Bagherpour | G06F 3/013 |
| 12,242,580 | B1 * | 3/2025 | Philbrick | G06F 21/84 |
| 2013/0169545 | A1 * | 7/2013 | Eaton | G06F 1/1649 345/173 |
| 2013/0300985 | A1 * | 11/2013 | Bulda | G02F 1/1323 349/86 |
| 2016/0070344 | A1 * | 3/2016 | Gohl | G09G 5/377 345/156 |
| 2018/0217429 | A1 * | 8/2018 | Busch | G02F 1/076 |
| 2018/0374431 | A1 * | 12/2018 | Adams | G06F 21/84 |

(Continued)

OTHER PUBLICATIONS

Sergio R. Restaino, Scott W. Teare, "Introduction to Liquid Crystals for Optical Design and Engineering", Date Published: Jul. 10, 2015, pp. 130, ISBN: 9781628418071, vol. TT100.

(Continued)

*Primary Examiner* — Christopher C Harris

(74) *Attorney, Agent, or Firm* — Carroll, Hoette & Butscher, LLC; William Breeze

(57) ABSTRACT

An electronic system and method detect orientations of display devices of an electronic system, and determine an orientation mode of the display devices. The system and method identify one or more software applications presenting information on at least one of the display devices. Electronically controlled privacy filters in the display devices are individually activated or deactivated in the at least one of the display devices to alter opacity of the displayed information based on one or more of the orientations of the display devices and/or the one or more software applications.

20 Claims, 7 Drawing Sheets

(56) References Cited

U.S. PATENT DOCUMENTS

| | | | | |
|---|---|---|---|---|
| 2020/0050265 | A1* | 2/2020 | Krishnakumar | G06F 3/013 |
| 2020/0096802 | A1* | 3/2020 | Busch | G02F 1/076 |
| 2020/0225901 | A1* | 7/2020 | Boissière | H04L 65/764 |
| 2020/0349903 | A1* | 11/2020 | Pelissier | G06F 3/0393 |
| 2021/0097208 | A1* | 4/2021 | Donahue | G06F 21/84 |
| 2022/0012376 | A1* | 1/2022 | Hsieh | H04M 1/0243 |
| 2024/0021139 | A1* | 1/2024 | Chang | G09G 3/20 |

OTHER PUBLICATIONS

FlexEnable, "ePrivacy Screens", https://www.flexenable.com/applications/eprivacy-screens/#:~:text=Flexible%2C, 2024, 4 pages.

* cited by examiner

SYSTEM AND METHOD FOR DYNAMIC PRIVACY FILTER

BACKGROUND

Embodiments herein generally relate to electronic systems and methods for dynamically changing a privacy filter to limit the visibility of certain information displayed on the electronic systems based on orientations of the electronic systems.

Electronic systems, such as laptop computers, mobile phones, personal digital assistants (PDAs), iPads, other computing devices, etc. have become part of many individuals' everyday life. Such electronic systems continue to be improved to make the experience of users as enjoyable as possible.

Some known privacy filters can be used to limit the visibility of the displays of electronic systems. For example, some privacy filters are a static body (e.g., a film) that is placed over the screen of an electronic system to inhibit visibility of information displayed on the screen to persons that are standing to one side, above, or below the screen. A person viewing directly at the screen can still see the information presented on the screen. More recently, electronic privacy filters can electronically reduce screen visibility from side angles to prevent or inhibit visibility of displayed information to persons that are on either side of the screen.

Some recent electronic systems include two or more displays. For example, some laptop computers having two electronic displays connected to each other by a hinge. While the additional display can present more information to a user of the electronic system, the additional display also can make the information that is displayed less private and may make it more difficult to prevent the visibility to unwanted viewers. Additionally, while static privacy filters may be used on the multiple displays of an electronic system, this may be undesirable in some situations as the user may wish to make information presented on one screen visible and keep information presented on another screen less visible at different times.

Thus, a need may exist for electronic systems and methods that provide increased control over privacy filters on displays of the electronic systems.

SUMMARY

In accordance with embodiments herein, an electronic system is provided that can include multiple electronic display devices each including an individually and electronically controllable privacy filter that adjusts opacities of information that is electronically presented on the display device. The electronic system can include one or more sensors operably coupled with the display devices. The sensors can detect orientations of the display devices. The electronic system can include a control unit that can receive a signal from the one or more sensors that indicates the orientations of the display devices that are detected. The control unit can identify an orientation mode of the display devices, and activate or deactivate the electronically controllable privacy filters in the display devices to independently control the opacities of the information presented on the display devices based on the orientation mode.

A method is provided that includes detecting orientations of multiple display devices, identifying an orientation mode of the display devices based on the orientations that are detected, and individually activating or deactivating electronically controllable privacy filters in the display devices to independently control opacities of information presented on the display devices based on the orientation mode that is identified.

Another electronic system includes display devices each having an electronically controllable privacy filter, at least one sensor that can detect orientations of the display devices, and a control unit that can determine an orientation mode of the display devices and identify one or more software applications presenting information on at least one of the display devices. The control unit can individually activate or deactivate the electronically controlled privacy filter in the at least one of the display devices to alter an opacity of the information presented on the at least one of the display devices. The control unit can individually activate or deactivate the electronically controlled privacy filter based on one or more of the orientations of the display devices or the one or more software applications.

DETAILED DESCRIPTION

Figure 1:
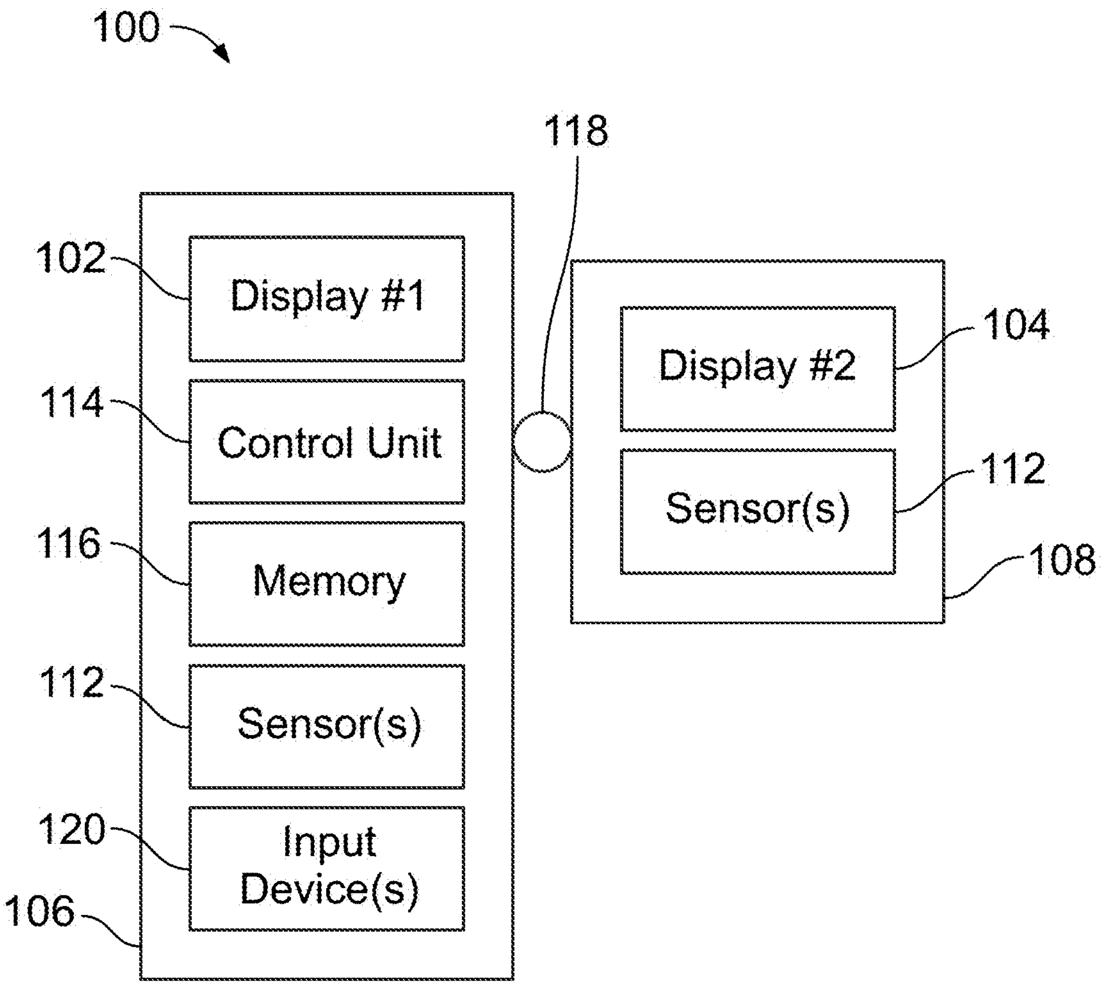
FIG. 1 illustrates a block diagram of one example of an electronic system for dynamically controlling an electronic filter on one or more displays of the electronic system.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment," or the like, in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "electronic system" as used herein shall mean any device, system, controller, etc. utilized by a user that may monitor and communicate data and information. Electronic systems can include IPADs, laptop computers, tablets, etc. The electronic system is also configured to communicate with other electronic systems. The electronic system may communicate with one or more other electronic systems over wires, through one or more wireless protocols including Bluetooth, GSM, infrared wireless LAN, HIPERLAN, 4G, 5G, satellite, or the like.

The phrase "dynamically adjust" or "dynamically adjusting" or "dynamically adjusted" may be used interchangeably and when used herein refers to changing or varying in real time in response to a condition, or otherwise.

The phrase "real time" as used herein shall mean at the same time, or a time substantially contemporaneous, with an occurrence of another event or action. For the avoidance of doubt, as an example, a dynamically adjusted object or device is changed immediately, or within a second or two.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Electronic systems and methods that include or provide dynamic privacy filters are described herein. The dynamic privacy filters can be electronically controlled, and may be used on multi-screen electronic systems, such as dual screen laptop computers. Not all embodiments are limited to dual screen electronic systems or laptop computers. One or more embodiments may be used in connection with electronic systems having a single screen or three or more screens. One or more embodiments may be used with electronic systems other than laptop computers. Additionally, while some embodiments are described as providing an electronic and dynamic privacy filter for an entire screen, one or more other embodiments may only provide the privacy filter over a portion, but not all, of a screen (e.g., just the portion of the screen displaying private information or displaying a graphical user interface, or GUI, of a designated application).

The electronic systems and methods can automatically adjust the level and direction of privacy based on the orientation of the screen and/or electronic system. For example, the privacy filter can be displayed on an upper screen while the electronic system is in a standing orientation, the privacy filter can be deactivated on both screens while the electronic system is in a tent orientation, the privacy filter can be activated on one screen (e.g., closer to the user) and deactivated on another screen (e.g., farther from the user) in a book orientation, or the like. The electronic systems can include orientation sensors that detect the orientation of the devices and/or screens of the devices. These devices can include hinge angle sensors, accelerometers, Hall effect sensors, or the like. These sensors can detect the relative positions of multiple screens and/or input device(s) of an electronic system, such as the pitch, yaw, and/or roll of each of the screens. The sensors can output signals indicative of the orientations of the devices and/or screens to control units of the electronic systems. The control units can activate or deactivate the electronic privacy filters based on these signals.

The electronic systems and methods described herein can dynamically adjust privacy levels and angles based on the orientations of the electronic systems. The privacy filters can be independently controlled on each screen of an electronic system. Optionally, the privacy filters can be independently controlled in different segments or portions of the same screen of an electronic system. The control settings for when the electronic privacy filter is activated or deactivated, as well as which screen the filter is activated or deactivated, can be synchronized between multiple screens or electronic systems, or may be individually controlled and applied to individual screens. The electronic systems and methods can use a combination of hardware (e.g., hinge angle sensors, orientation sensors, etc.) and software algorithms for real-time privacy control.

FIG. 1 illustrates a block diagram of one example of an electronic system 100 for dynamically controlling an electronic filter on one or more displays 102, 104 of the electronic system 100. The electronic system 100 can be a laptop, personal computer, or the like. In one example, the electronic system 100 is a dual screen (e.g., dual display 102, 104) laptop. The displays 102, 104 may be separate electronic screens that present information (e.g., alphanumeric text, images, videos, etc.). The displays 102, 104 can be in different housings 106, 108 that are connected with each other by a mechanical interface 110, such as by a hinge. The displays 102, 104 and the housings 106, 108 can be mechanically coupled but move independent of each other. For example, the housings 106, 108 may be connected by a hinge or magnet 118, and the angle between the housings 106, 108 of the displays 102, 104 can be changed by pivoting the housings 106, 108 relative to each other. Optionally, the displays 102, 104 may be in a single housing 106 or 108, such as a flexible housing that can bend such that the screens for each of the displays 102, 104 can change orientations relative to each other.

One or more sensors 112 can be positioned to sense the orientation and/or positions of the displays 102, 104. For example, the sensor(s) 112 can include one or more hinge angle sensors, accelerometers, gyroscopes, and/or magnetometers (or combinations of two or more of accelerometers, gyroscopes, and/or magnetometers) that sense angles of the sensors(s) 112 (and, therefore, displays 102, 104) relative to each other and/or to reference planes. For example, the sensor 112 can represent a hinge angle sensor that is at least partially disposed in the hinge or magnet 118 and can output a signal indicative of the angle between the screens of the display devices 102, 104.

Optionally, the reference planes referred to above may include a horizontal reference plane (e.g., an x-y plane in an x-y-z rectangular or spatial coordinate system), a first vertical reference plane (e.g., an x-z plane in the rectangular or spatial coordinate system), and/or a second vertical reference plane (e.g., a y-z plane in the rectangular or spatial coordinate system). The sensor(s) 112 can measure or estimate tilt angles of the displays 102, 104 from one or more of these reference planes and/or around one or more of the x, y, or z axes of the reference planes. For example, the sensor(s) 112 can measure a pitch angle as the angle that the display 102, 104 is tilted from the horizontal plane, such as the angle that the display 102, 104 is rotated around or about the x-axis. The sensor(s) 112 can measure a roll angle as the angle that the display 102, 104 is tilted from the horizontal plane, such as the angle that the display 102, 104 is rotated around or about the y-axis. The sensor(s) 112 can measure a yaw angle as the angle that the display 102, 104 is tilted from the first and/or second vertical plane, such as the angle that the display 102, 104 is rotated around or about the z-axis. These tilt angles may be measured by the sensor(s) 112 as angles between (a) planes of the display devices 102, 104, the housings 106, 108 (e.g., the front, visible surface of the screens), and/or the input device(s) 120 and (b) one or more reference planes, such as a horizontal plane or a vertical plane.

A control unit 114 may be disposed in at least one of the housings 106, 108 or may be in a housing that is separate from the housings 106, 108 of the displays 102, 104. The control unit 114 can represent hardware circuitry that includes and/or is connected with one or more processors (e.g., integrated circuits, field programmable gate arrays, microprocessors, controllers, etc.) that perform the operations described herein in connection with the control unit 114. The control unit 114 can operate based on instructions (e.g., software applications) stored in one or more tangible and non-transitory computer readable storage media 116 ("Memory" in FIG. 1), such as computer hard drives, solid state drives, or the like. While the control unit 114 and memory 116 are shown as being in the same housing 106, optionally, the control unit 114 and memory 116 may be in different housings 106, 108 and/or multiple control units 114 and/or memories 116 can be provided in the multiple housings 106, 108. The electronic system 100 can include one or more input devices 120 that receive input from a user. The input device(s) 120 can include keyboards, styluses, microphones, touchscreens (e.g., as part of one or both displays 102, 104 or separate from both displays 102, 104), or the like. The input device(s) 120 also can include one or more of the sensors 112 for measuring the orientation of the input device(s) 120.

The control unit 114 can receive the tilt angles from the sensor(s) 112 and determine the orientation of the displays 102, 104, such as whether the displays 102, 104 are substantially horizontal, substantially vertical, in a landscape mode (e.g., the longer outer dimensions of the housings 106, 108 are substantially horizontal and/or the shorter outer dimensions of the housings 106, 108 are substantially vertical), or in a portrait mode (e.g., the longer outer dimensions of the housings 106, 108 are substantially vertical and/or the shorter outer dimensions of the housings 106, 108 are substantially horizontal). As used herein, "substantially" means closer to the identified orientation than farther from the identified orientation. For example, the displays 102, 104 may be substantially horizontal (or substantially horizontally oriented) while the housings 106, 108 are closer to a horizontal orientation or direction (e.g., such as on a table, desk, or person's lap) than a vertical orientation or direction (e.g., perpendicular to the table, desk, or lap). The displays 102, 104 may be substantially vertical (or substantially vertically oriented) while the housings 106, 108 are closer to the vertical orientation or direction than the horizontal orientation or direction. The longer outer dimensions of the housings 106, 108 can be the longest outer edge of the housings 106, 108 or screens of the displays 102, 104 and the shorter outer dimensions of the housings 106, 108 can be the shortest outer edge of the housings 106, 108 or screens of the displays 102, 104, as shown in FIG. 2 and described below.

The control unit 114 can identify the orientation mode by comparing the sensed tilt angles of the display devices 102, 104, the input device 120, and/or the housings 106, 108 of the display devices 102, 104 with designated orientations or ranges of designated orientations that are associated with different modes. If the set of tilt angles measured for a display 102 or 104 fall within a first set of different ranges of tilt angles, then the control unit 114 can determine that the display 102 or 104 is in a first orientation mode. If the set of tilt angles measured for a display 102 or 104 fall within a different, second set of different ranges of tilt angles, then the control unit 114 can determine that the display 102 or 104 is in a different, second orientation mode, and so on.

Figure 2:
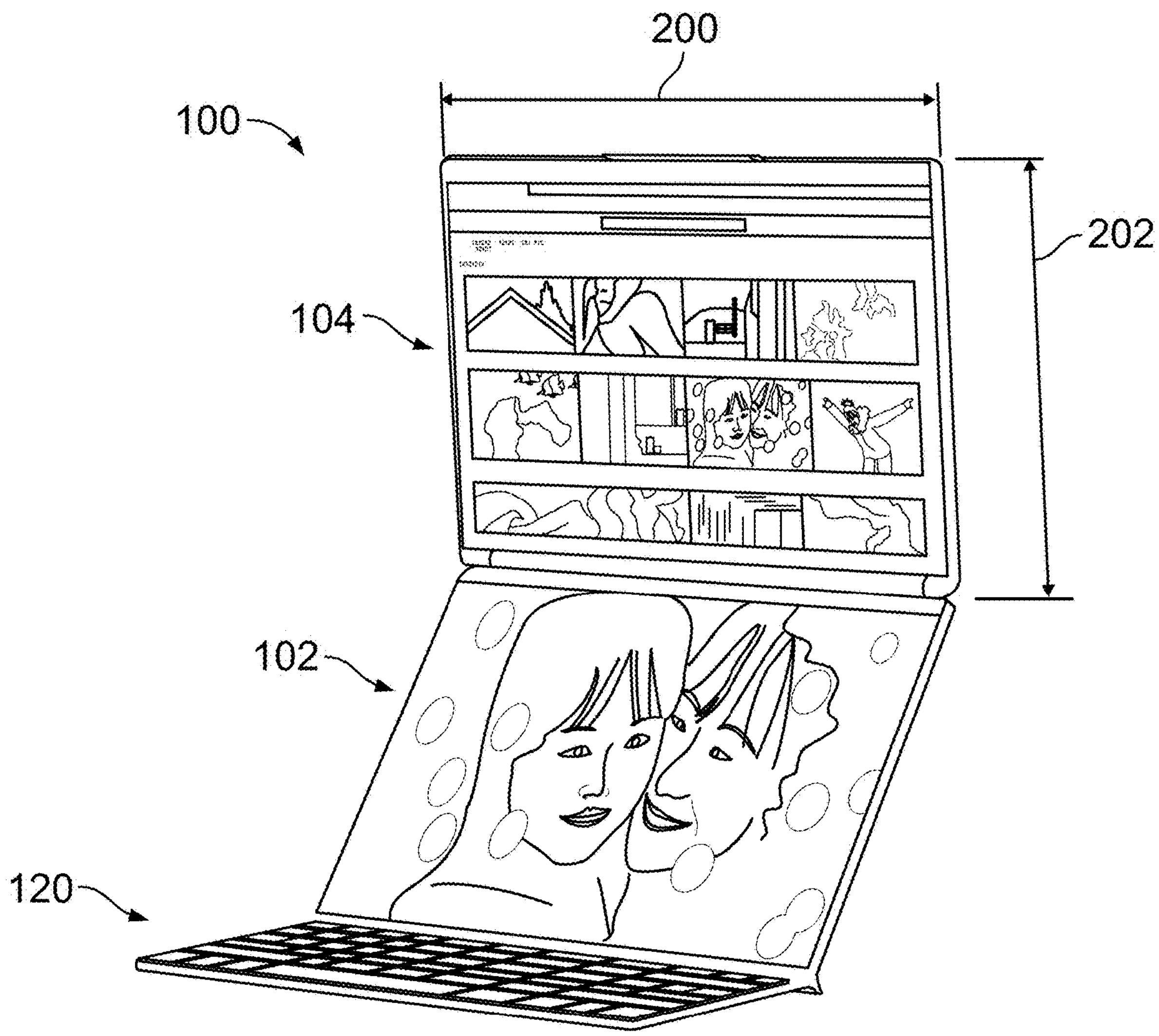
FIG. 2 illustrates one example of the electronic system shown in FIG. 1 in a standing vertical orientation mode.

FIG. 2 illustrates one example of the electronic system 100 shown in FIG. 1 in a standing vertical orientation mode. In this orientation mode, the input device 120 lies substantially horizontal on a surface, the display 102 extends upward from the input device 120 in a substantially vertical direction, and the display 104 extends upward from the display 102 and is spaced apart from the input device 120 by the display 102. As described above, the housing 104, 106 of each display 102, 104 may have a longer outer edge dimension 200 and a shorter outer edge dimension 202. The dimensions 200, 202 may be the same for both displays 102, 104, or may differ from each other. The dimensions 200, 202 may be measured along the outer edges of the housings 104, 106, as shown in FIG. 2. A display 102, 104 can be in a portrait orientation or mode when the longer edge dimension 200 is substantially vertical and the shorter edge dimension 202 is substantially horizontal. A display 102, 104 can be in a landscape orientation or mode when the longer edge dimension 200 is substantially vertical and the shorter edge dimension 202 is substantially horizontal. In the standing vertical orientation mode, both displays 102, 104 can be in the landscape orientation.

Figure 3:
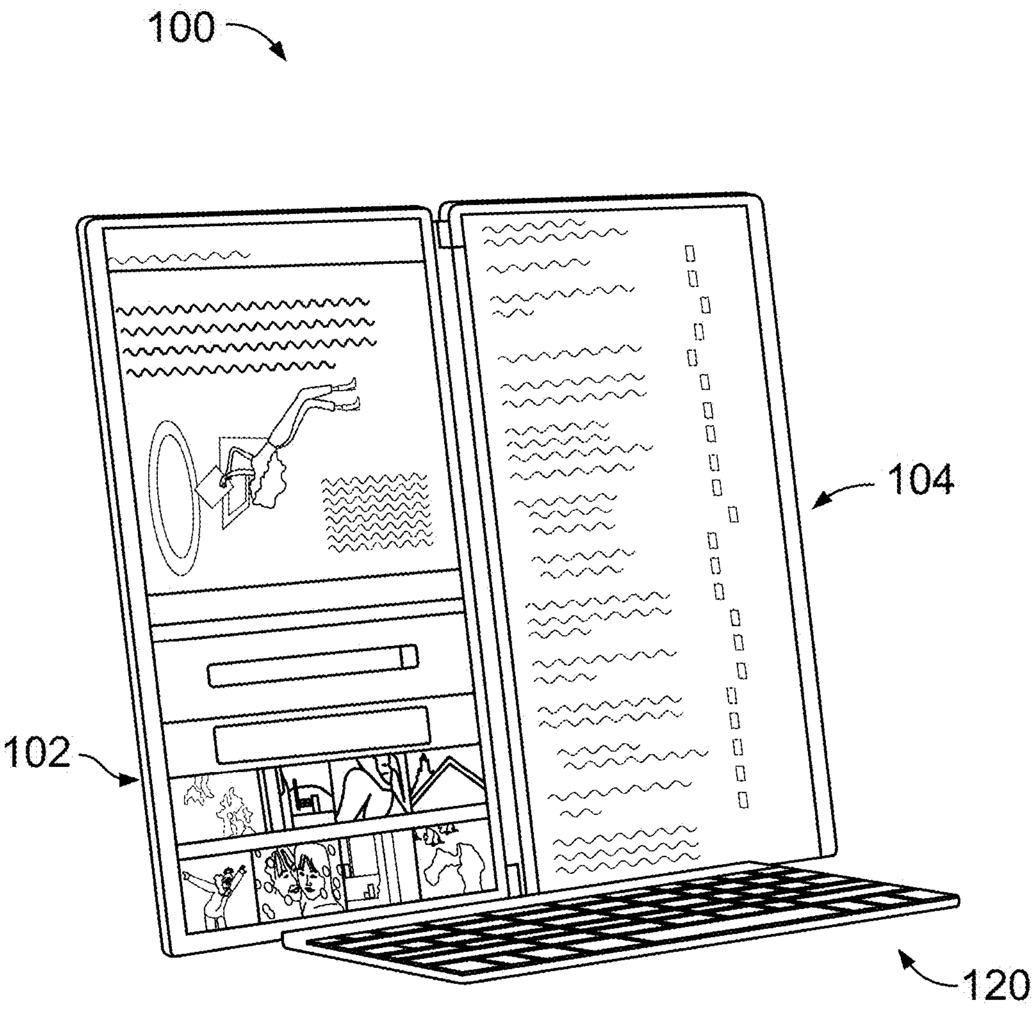
FIG. 3 illustrates one example of the electronic system shown in FIG. 1 in a standing or vertical book orientation mode.

FIG. 3 illustrates one example of the electronic system 100 shown in FIG. 1 in a standing or vertical book orientation mode. In this orientation mode, the input device 120 lies substantially horizontal on a surface, and both displays 102, 104 extend upward from the input device 120 in substantially vertical directions. The displays 102, 104 may be side-by-side similar to the opposing pages of a book. In contrast to the standing vertical orientation mode shown in FIG. 2, the display 104 in the standing book orientation mode is not spaced apart or separated from the input device 120 by the other display 102. Instead, both displays 102, 104 contact and/or extend upward from the input device 120. The displays 102, 104 may both be in the portrait orientation in the standing book mode.

Figure 4:
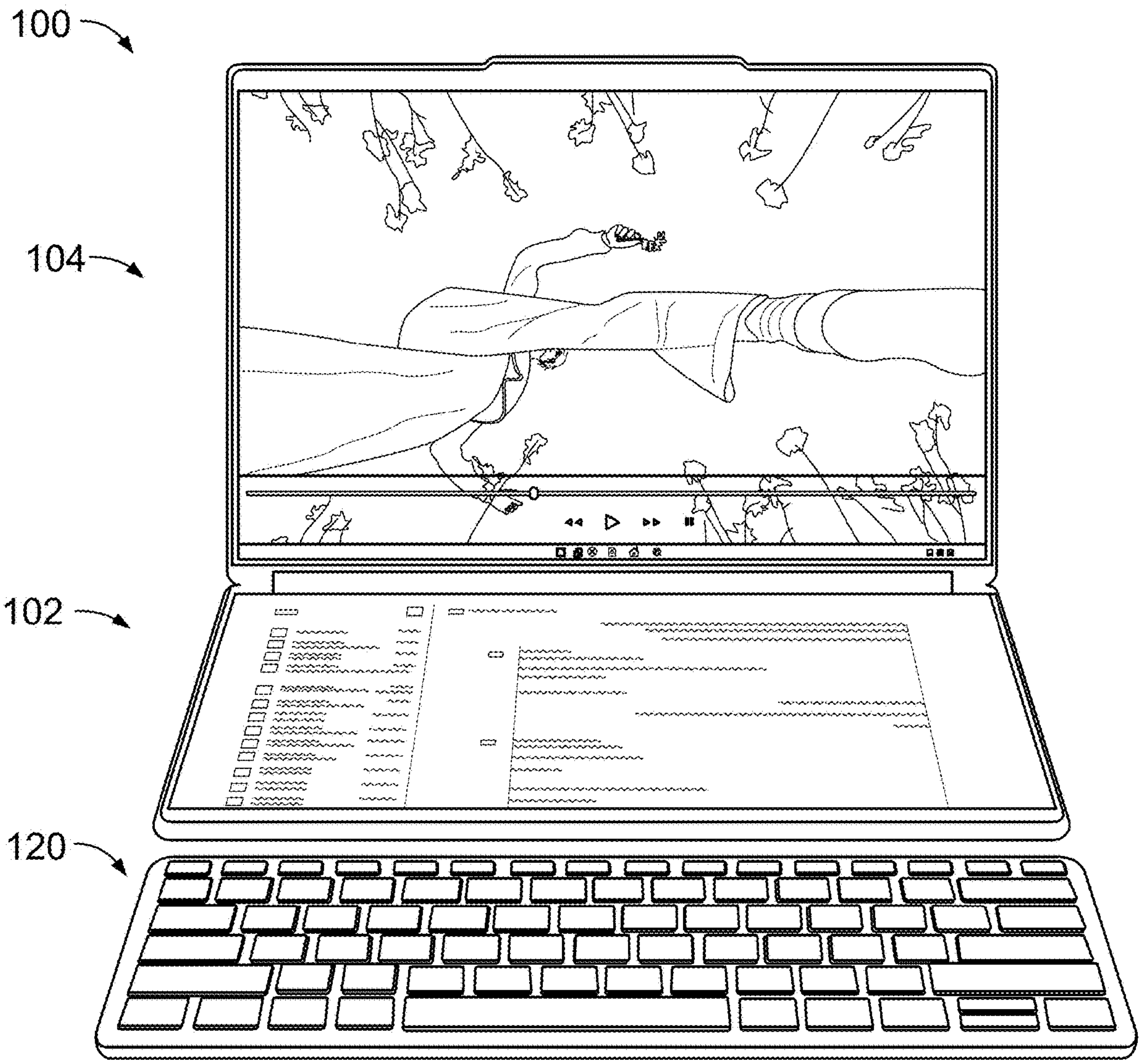
FIG. 4 illustrates one example of the electronic system shown in FIG. 1 in an extended laptop orientation mode.

FIG. 4 illustrates one example of the electronic system 100 shown in FIG. 1 in an extended laptop orientation mode. In this orientation mode, the input device 120 and the display 102 lie substantially horizontal on a surface, and the display 104 extends upward from the display 102 in a substantially vertical direction. Similar to the standing vertical orientation mode shown in FIG. 2, the display 104 may be spaced apart from the input device 120 by the display 102. In contrast to the standing vertical orientation mode and the standing book mode, however, the display 102 is substantially horizontally oriented along with the input device 120. The input device 120 may be spaced apart or separate from the display 102 as shown, or may be coupled to the display 102 (e.g., via connectors, magnets, a hinge, or the like). Both displays 102, 104 may be in the landscape orientation in the extended laptop orientation mode.

Figure 5:
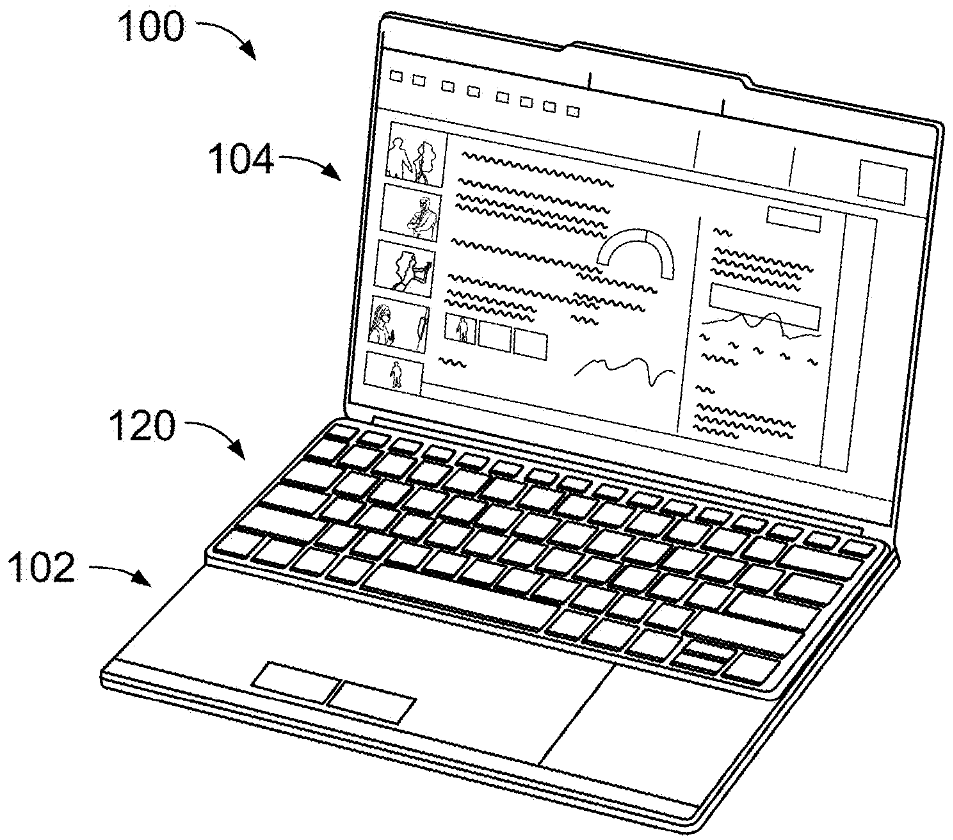
FIG. 5 illustrates one example of the electronic system shown in FIG. 1 in a condensed laptop orientation mode.

FIG. 5 illustrates one example of the electronic system 100 shown in FIG. 1 in a condensed laptop orientation mode. In this orientation mode, the input device 120 and the display 102 lie substantially horizontal on a surface with the input device 120 located or disposed over (on top of) the display 102, and the display 104 extends upward from the input device 120 and the display 102 in a substantially vertical direction. Similar to the laptop orientation mode shown in FIG. 4, the input device 120 and the display 102 may be substantially horizontal. In contrast to the extended laptop orientation mode in FIG. 4, the condensed laptop orientation mode has the input device 120 on the display 102 and the display 104 closer to, connected with, or extending from the input device 120 (and not separated from the input device 120 by the other display 102). Both displays 102, 104 may be in the portrait orientation in the condensed laptop orientation mode.

Figure 6:
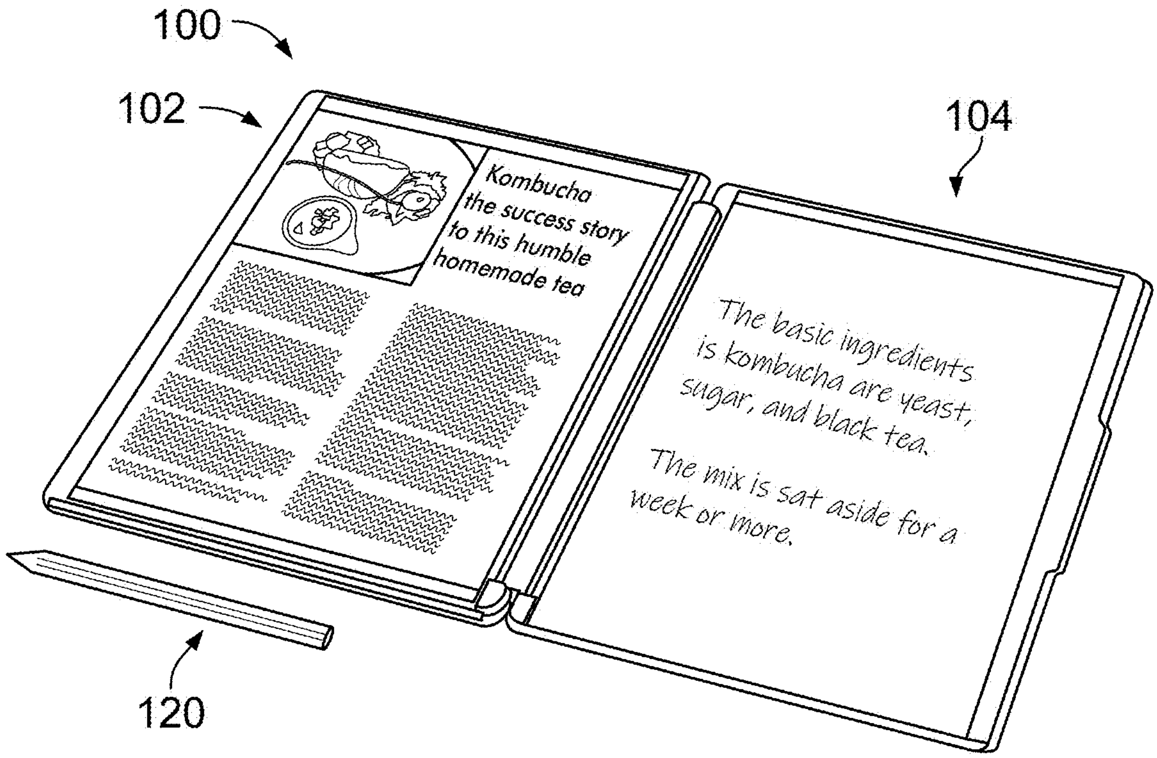
FIG. 6 illustrates one example of the electronic system shown in FIG. 1 in a lying or horizontal book orientation mode.

FIG. 6 illustrates one example of the electronic system 100 shown in FIG. 1 in a lying or horizontal book orientation mode. In this orientation mode, both displays 102, 104 lay horizontally flat or are substantially horizontal. The input device 120 may be separated from or not used in this mode, or the input device 120 may include a stylus and be incorporated into the display(s) 102 and/or 104 as a touchscreen. The displays 102, 104 may be side-by-side similar to the opposing pages of a book. In contrast to the vertical book orientation mode shown in FIG. 3, the displays 102, 104 are closer to horizontal than vertical. Both displays 102, 104 may be in the portrait orientation in the horizontal book orientation mode.

Figure 7:
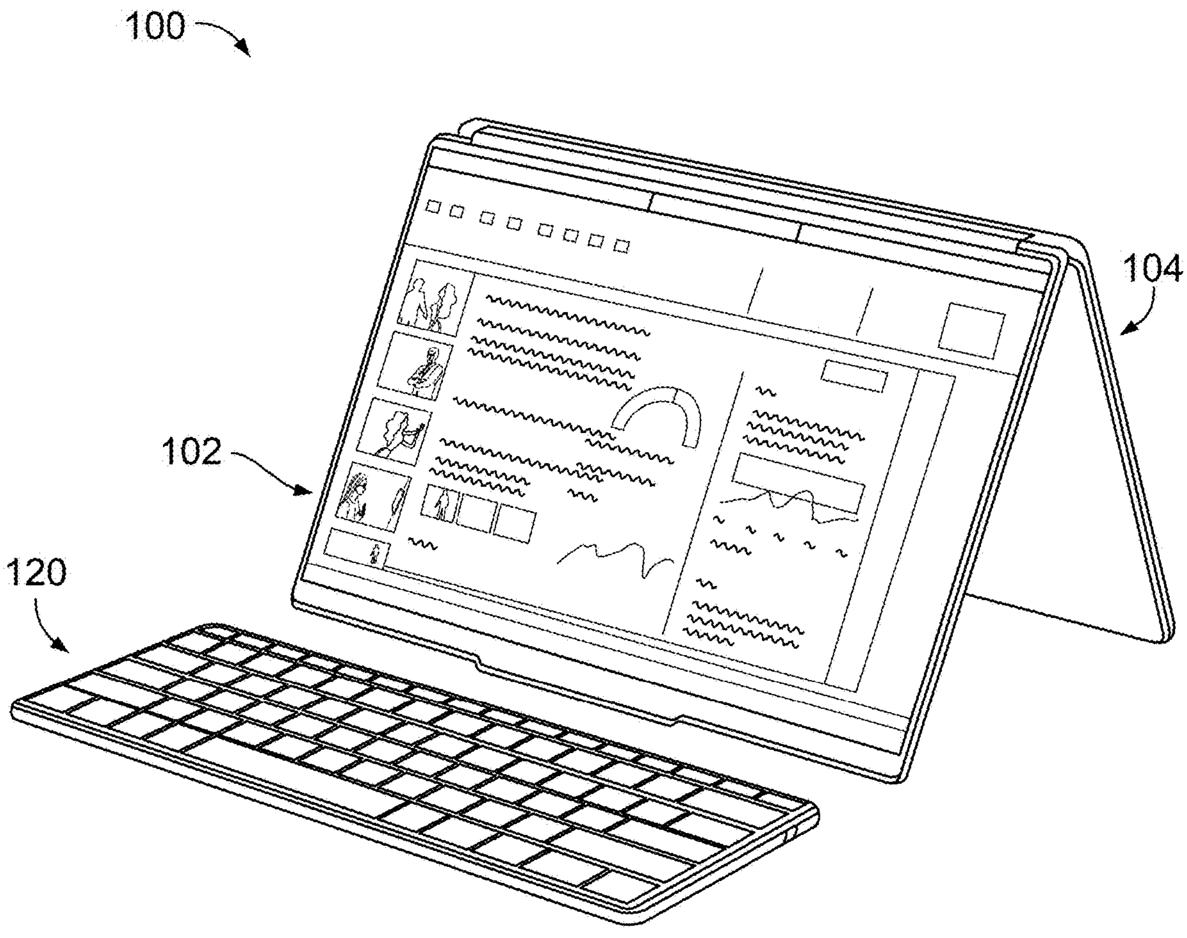
FIG. 7 illustrates one example of the electronic system shown in FIG. 1 in a tent or presentation orientation mode.

FIG. 7 illustrates one example of the electronic system 100 shown in FIG. 1 in a tent or presentation orientation mode. In this orientation mode, the displays 102, 104 are angled to face different substantially opposite directions (directions that face away from each other more than face each other). The input device 120 may be coupled with the display 102 and/or 104, or may be separate from the displays 102, 104 as shown (and wirelessly communicate with the displays 102, 104 and/or control unit 114 shown in FIG. 1). The displays 102, 104 may be side-by-side similar to the opposing pages of a book. In contrast to the vertical book orientation mode shown in FIG. 3, the displays 102, 104 are closer to horizontal than vertical. Both displays 102, 104 may be in the portrait orientation in the tent or presentation orientation mode.

The control unit 114 can identify the orientation mode of the electronic system 100 using the title angle(s) output by the sensor(s) 112. For example, if both displays 102, 104 are substantially vertical and in landscape orientations (and/or the input device 120 is substantially horizontal), then the control unit 114 can decide that the electronic system 100 is in the standing vertical orientation mode shown in FIG. 2. If both displays 102, 104 are substantially vertical and in portrait orientations (and/or the input device 120 is substantially horizontal), then the control unit 114 can decide that the electronic system 100 is in the standing book orientation mode shown in FIG. 3. If one display 102 or 104 is substantially horizontal and the other display 104 or 102 is substantially vertical (and/or in portrait orientations), then the control unit 114 can decide that the electronic system 100 is in the extended or condensed laptop orientation modes shown in FIGS. 4 and 5. Optionally, the control unit 114 may decide that the electronic system 100 is in the extended laptop orientation mode if the input device 120 also is substantially horizontal and/or is not located on top of the substantially horizontal display 102 or 104. The control unit 114 may decide that the electronic system 100 is in the condensed laptop orientation mode if the input device 120 also is substantially horizontal and/or is located on top of the substantially horizontal display 102 or 104. If both displays 102, 104 are substantially horizontal, then the control unit 114 can decide that the electronic system 100 is in the book orientation mode shown in FIG. 6. If both displays 102, 104 are substantially vertical and angled away from each other, then the control unit 114 can decide that the electronic system 100 is in the tent orientation mode shown in FIG. 7.

The control unit 114 can automatically control activation or deactivation of an electronic privacy filter shown on the display devices 102, 104. For example, the display devices 102, 104 may have EPRIVACY filters provided by LENOVO. The control unit 114 can then control the electronic privacy filter for one or more of the display devices 102, 104. For example, the control unit 114 can activate the privacy filter for one display device 102 or 104 and deactivate the privacy filter (or keep the privacy filter deactivated) for the other display device 104, the control unit 114 can activate the privacy filter for both display devices 102, 104, or the control unit 114 can deactivate the privacy filter (or keep the privacy filter deactivated) for both display devices 102, 104 based on the orientation mode that is detected.

In one example, the privacy filter is an electronically controlled filter that is formed as a film that is part of or permanently coupled with (and inseparable from) the screen of a display device 102, 104. This is in contrast to the privacy films that may be adhered to the screens of display devices 102, 104 or may be removably attached to the display devices 102, 104. For example, these adhesive privacy films or removable privacy screens may be placed onto the display devices 102, 104 to limit or reduce visibility of the information presented on the display devices 102, 104 at certain viewing angles (e.g., to the side, above, or below the user of the display devices 102, 104). In contrast, the electronic privacy filters described herein are integrated into the display devices 102, 104 and can be activated by changing the angle(s) of light emitted by the display devices 102, 104 to reduce or prevent visibility of this light from persons or cameras viewing the display devices 102, 104 from the sides or above or below the user of the display devices 102, 104. One example of such an electronic privacy filter is Lenovo's EPRIVACY screen. This is a built-in privacy filter that reduces screen visibility from side angles, thereby protecting sensitive information from other viewers. The EPRIVACY screen can be activated by the control unit 114 and the level of privacy can be adjusted (e.g., the brightness or angle by which light is emitted can be changed for different levels of privacy).

Figure 8:
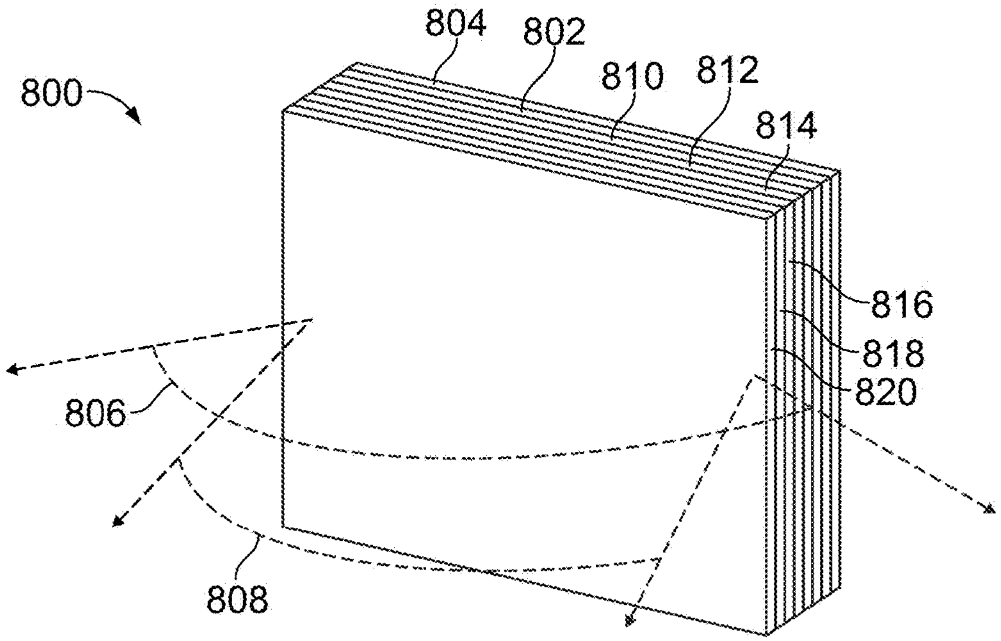
FIG. 8 illustrates one example of a display device having an electronic privacy filter.

FIG. 8 illustrates one example of a display device 800 having an electronic privacy filter 802. The display device 800 can represent each of the display devices 102, 104. The components of the display device 800 shown in FIG. 8 may not be drawn to scale. The display device 800 can include a backlight assembly 804 that generates light that is to be transmitted through other components of the display device 800 to present information to a user. For example, the backlight assembly 804 can represent one or more light sources or lamps that generate the light. The electronic privacy filter 802 may be coupled with the backlight assembly 804. The privacy filter 802 can include electronically activated cells or lines that can diffract the light generated by the backlight assembly 804 at different angles depending on whether the privacy filter 802 is activated or deactivated. For example, when deactivated, the privacy filter 802 polarizes the light from the backlight assembly 804 along a first direction while allowing the light to pass through along a perpendicular second direction and allowing the light to be visible along a wider visible range of angles 806. When activated, the privacy filter 802 still polarizes the light from the backlight assembly 804 along the first direction while allowing the light to pass through along the second direction. But the activated privacy filter 802 can become more opaque and block or diffuse the light along some of the second direction by activating cells or lines of electrochromic material in the privacy filter 802 to restrict how much of the light is visible. For example, the range of angles 806 over which the light is visible may be reduced to a filtered range of angles 808. These cells or lines of electrochromic material can be deactivated to increase the width of the angles over which the light is visible and passes through the privacy filter 802. This allows the filters 802 to individually control the opacity of the information displayed on the display devices 102, 104.

The polarized light passing through the privacy filter 802 (whether activated or deactivated) then passes through a translucent electrode layer 810 (e.g., an indium tin oxide layer, or ITO layer), and then through a layer of liquid crystal material 812. This light can then pass through another translucent electrode layer 814 (e.g., another ITO layer), a color filter layer 816, a translucent polarizing layer 818 that polarizes the light along the second direction, and one or more optional translucent cover or protective layers 820.

As described above, the control unit 114 can receive signals from the sensors 112, decide which orientation mode the electronic system 100 is in based on the signals, and then activate the privacy filter 802, deactivate the privacy filter 802, keep the privacy filter 802 activated, or keep the privacy filter 802 deactivated based on the orientation that is identified.

For example, the control unit 114 can activate the privacy filter 802 in the display device 104 while deactivating the privacy filter 802 in the display device 102 while the electronic system 100 is in the standing vertical orientation mode (e.g., FIG. 2). This can allow a user to privately see the information presented on the lower display device 102 (as the user's head and/or torso is likely to block or reduce visibility of the lower display device 102) and the electronic privacy filter 802 can reduce the visibility of the information displayed on the upper display device 102, which may not be blocked by the user. In locations such as crowded coffee shops, restaurants, libraries, airports, etc., this can allow the user to continue using and viewing both display devices 102, 104 while keeping the information displayed on both display devices 102, 104 private from view by others.

In one example, the sensor(s) 112 can include one or more cameras located within or coupled to the housing(s) 106, 108 of one or both the display devices 102, 104. The camera(s) can detect the eye level of the user relative to the display device 102 and/or the display device 104. For example, the camera(s) can detect the location of the user's eyes and whether the user's eyes are looking upward at the camera(s), down at the camera(s), and/or are level with the camera(s). For the camera(s) that detect the user is looking up at the display device 102 or 104 (i.e., the display device 102 in FIG. 2), the control unit 114 may activate the privacy filter 802 for that display device 102. For the camera(s) that detect the user is looking directly at the camera(s) (e.g., the camera is eye-level with the user) or down at the camera(s), such as the camera of the display device 104, the control unit 114 may not activate or may deactivate the privacy filter 802 for that display device 104.

In the standing or vertical book orientation mode (e.g., FIG. 3), the control unit 114 may activate the privacy filter 802 for one, but not both, of the display devices 102, 104. For example, the control unit 114 may activate the privacy filter 802 for the display device 102 and deactivate or not activate the privacy filter 802 for the display device 104. This can allow the user to view the information presented on the display device 104 while the information displayed on the display device 102 is visible to another person (e.g., sitting next to the user). This can allow the user to continue viewing confidential information (e.g., price lists, inventories, etc.) while presenting other information to a customer during a business meeting.

The control unit 114 may activate the privacy filter 802 in the display device 102 or 104 that is more vertically oriented than the other display device 104 or 102 while the electronic system 100 is in the extended laptop orientation mode. This can help reduce the visibility of the information presented on the vertically oriented display device 104 (in the example of FIG. 4) to persons other than the user while allowing the information presented on the horizontally oriented display device 102 (in the example of FIG. 4) to be more clearly visible. Alternatively, the control unit 114 may activate the privacy filter 802 in both the display devices 102, 104 while the electronic system 100 is in the extended laptop orientation mode. This can help ensure that all information displayed on the exposed display devices 102, 104 is less visible to persons other than the user.

The control unit 114 may activate the privacy filter 802 in the display device 102 or 104 that is more vertically oriented than the other display device 104 or 102 and/or that is not covered by the input device 120 while the electronic system 100 is in the condensed laptop orientation mode. This can help reduce the visibility of the information presented on the vertically oriented and uncovered display device 104 (in the example of FIG. 5) to persons other than the user while allowing the information presented on the horizontally oriented and at least partially covered display device 102 (in the example of FIG. 5) to be more clearly visible. Because the input device 120 may cover or occlude the visibility of the information presented on the horizontally oriented display device 102 in this mode, the control unit 114 may not need to activate the privacy filter 802 in the display device 102.

In the lying or horizontal book orientation mode (e.g., FIG. 6), the control unit 114 may activate the privacy filter 802 for one, but not both, of the display devices 102, 104. For example, the control unit 114 may activate the privacy filter 802 for the display device 104 and deactivate or not activate the privacy filter 802 for the display device 102. This can allow the user to view the information presented on the display device 104 while the information displayed on the display device 102 is visible to another person (e.g., sitting next to the user). This can allow the user to continue viewing confidential information and/or take notes using the input device 120 that is not visible to another person (e.g., during a business meeting or negotiation).

In the tent or presentation orientation mode, the control unit 114 may deactivate the privacy filter 802 for both display devices 102, 104. This can allow the user to clearly see the information presented on one display device 102 or 104, while the information presented on the other display device 104 or 102 also is clearly visible. For example, a user sitting on one side of a table can be showing a presentation to another person sitting across from the user on the opposite side of the table. The user can see the information presented on the display device 102 while the other person can see the information presented on the display device 104. Because the display device 102 is facing away from the other person, the privacy filter 802 may not need to be activated to protect the privacy of the information shown on the display device 102.

Optionally, the control unit 114 may associate certain software applications with an activated privacy filter 802. The control unit 114 can determine which display device 102, 104 shows information from one or more of these software applications and activate the privacy filter 802 for that display device 102 and/or 104. In this way, the control unit 114 can operate as one of the sensors 112 described herein. This can allow the control unit 114 to automatically activate the privacy filter 802 to prevent information displayed by these software applications from being publicly visible. For example, software applications such as e-mail programs, social media applications, spreadsheet or accounting applications, and the like, may be identified (e.g., by the user and/or by default settings of the control unit 114) as being associated with an activated privacy filter 802. The control unit 114 may be integrated with an operating system of the electronic system 100 to activate the privacy filters 802 upon activation or opening of the software applications. This can allow the privacy of the information presented by these applications from being visible regardless of the orientation mode of the electronic system 102.

The control unit 114 can control the privacy settings for the display devices 102, 104 in a synchronous mode or manner. For example, the control unit 114 can activate the privacy filters 802 in both display devices 102, 104 concurrently or simultaneously, and can deactivate the privacy filters 802 in both display devices 102, 104 concurrently or simultaneously. This can help ensure that the privacy of all information presented by the electronic system 102 is maintained, regardless of the orientation mode of the electronic system 102.

Optionally, the control unit 114 can control the privacy settings for the display devices 102, 104 in an asynchronous mode or manner. For example, the control unit 114 can individually control which of the display devices 102, 104 has the privacy filter 802 activated or deactivated. The control unit 114 can activate the privacy filter 802 in one display device 102 while deactivating the privacy filter 802 in the other display device 104. The control unit 114 also may activate the privacy filters 802 in both display devices 102, 104, and/or can deactivate the privacy filters 802 in both display devices 102, 104.

The control unit 114 can use a combination of hardware output and software algorithms to control activation or deactivation of the privacy filters 802. For example, the control unit 114 can examine the output from the sensor(s) 112 as hardware output and determine which software applications are operating on the different display devices 102, 104 as the software algorithms. Based on a combination of the orientation mode and the software applications being used on each display device 102, 104, the control unit 114 can decide which privacy filter(s) 802 to activate or deactivate. The control unit 114 can ensure that the privacy filter 802 is activated in a display device 102, 104 if the electronic system 100 is operating in a mode in which the display device 102 and/or 104 should have the privacy filter 802 activated (as described herein) or the display device 102 and/or 104 is showing information from a software application that should have the privacy filter 802 activated. This can ensure that private information presented by a software application is protected (or more protected) from visibility to others, regardless of the orientation mode of the electronic system 100. For example, even if the electronic system 100 is in an orientation mode that would result in private information shown by an application being displayed on a display device 102, 104 having a deactivated privacy filter 802, the control unit 104 activates the privacy filter 802 for that display device 102, 104 to ensure that the private information is less visible to others (relative to the privacy filter 802 being deactivated).

The control unit 114 can activate or deactivate the privacy filter(s) 802 in real time. For example, as the orientation mode of the electronic system 100 is changed, the control unit 114 can activate and/or deactivate the privacy filter(s) 802 based on the current or new orientation mode. As another example, as a software application is opened or closed, the control unit 114 can activate and/or deactivate the privacy filter(s) 802 based on which software application(s) are open to ensure the information presented by the software application(s) is kept private or less visible to others.

Figure 9:
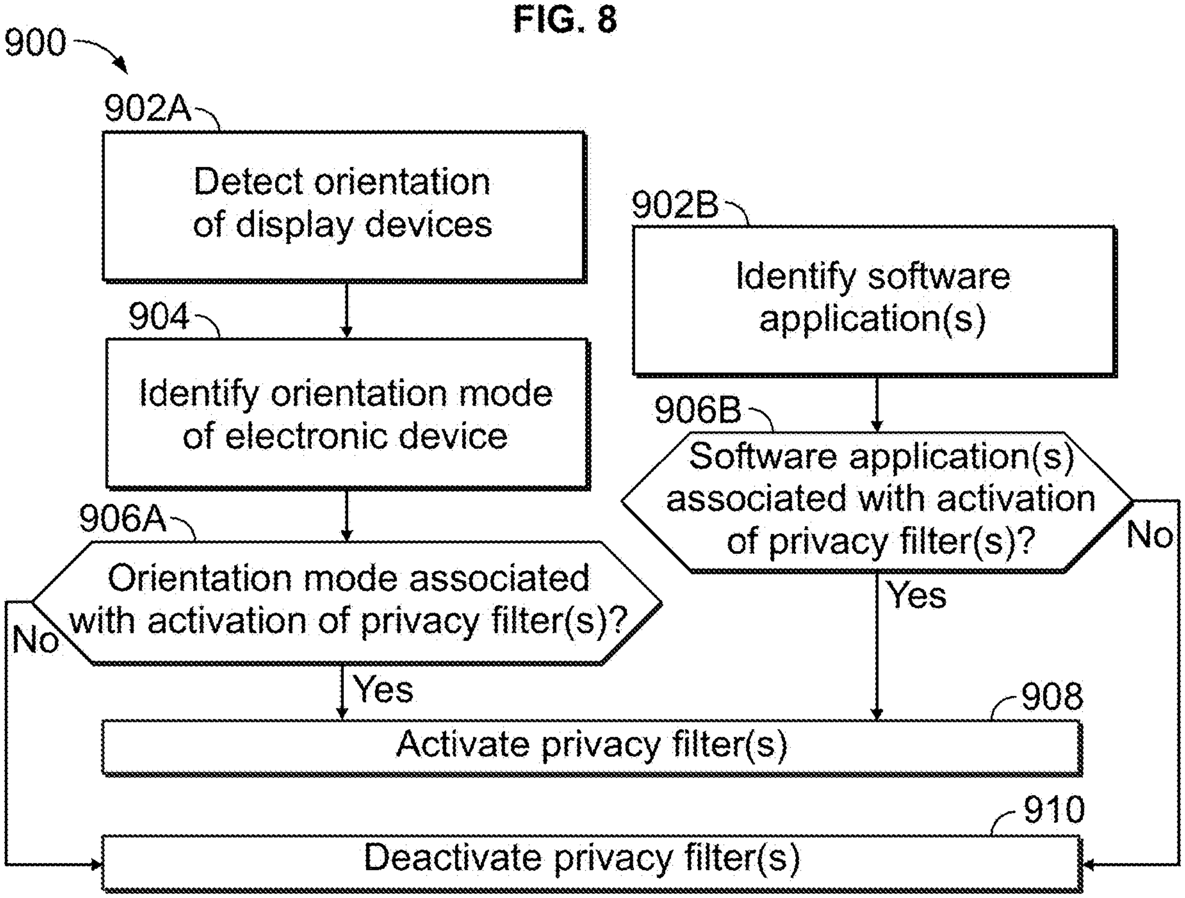
FIG. 9 illustrates a flowchart of one example of a method for controlling activation or deactivation of an electronic privacy filter.

FIG. 9 illustrates a flowchart of one example of a method 900 for controlling activation or deactivation of an electronic privacy filter. The method 900 can be used to dynamically and individually control activation of integrated electronic privacy filters (e.g., the filters 802) in the display devices 102, 104 of the electronic system 100 described herein. The method 900 is divided into multiple branches to indicate that the operations or steps in each branch can be performed in parallel. For example, the operations or steps 902A, 904, 906 in one branch can be performed at the same time or during a time period that overlaps with the operations or steps 902B, 906B of the other branch. Alternatively, the operations or steps in these branches can be performed sequentially and/or in another order or sequence.

At 902A, the orientation of the display devices relative to each other is detected. As described above, this orientation can be determined based on output from one or more sensors, such as hinge sensors, accelerometers, or the like. At 904, an orientation mode of the electronic system is determined using the orientation that is detected at 902A.

These modes can include, for example, the standing vertical orientation mode shown in FIG. 2, the vertical book mode shown in FIG. 3, the extended laptop orientation mode shown in FIG. 4, the condensed laptop orientation mode shown in FIG. 5, the horizontal book mode shown in FIG. 6, the tent orientation mode shown in FIG. 7, or the like. At 906A, a decision is made as to whether the orientation mode is associated with activation of the privacy filter in a display device. For example, different orientation modes can be associated with the activation or deactivation of the privacy filter 802 in the display device 102 and/or 104, as described herein. If it is decided that the privacy filter for a display device is to be activated, then flow of the method 900 can proceed toward 908 for that display device. If it is decided that the privacy filter for a display device is to be deactivated, then flow of the method 900 can proceed toward 910.

At 902B in the other branch, one or more software applications presenting information on the display devices 102, 104 are identified. At 906B, a decision is made as to whether any of these applications are associated with activation of the privacy filter. For example, one or more applications may be identified (e.g., by the user or by default settings) as applications that present private information. If it is decided that a display device is presenting information for an application associated with activation of the privacy filter, then flow of the method 900 can proceed toward 908 for that display device. If it is decided that the display device is presenting information for an application that is not associated with activation of the privacy filter (or that is associated with deactivation of the privacy filter), then flow of the method 900 can proceed toward 910 for that display device.

At 908, the electronic privacy filter in the display device is activated. For example, the electronic filter can be activated for the display device based on the orientation mode and/or based on the software application presenting information on that display device, as described herein. Flow of the method 900 can then return to one or more operations, such as 902A and 902B. This can allow for the method 900 to repeatedly monitor the orientation and/or software applications to ensure that the privacy filters 802 are dynamically activated and deactivated based on the changing orientation modes of the electronic system 100 and/or the applications presenting information on the display devices 102, 104.

At 910, the electronic privacy filter in the display device is deactivated. For example, the electronic filter can be deactivated for the display device based on the orientation mode and/or based on the software application presenting information on that display device, as described herein. Flow of the method 900 can then return to one or more operations, such as 902A and 902B. As described above, this can allow for the method 900 to repeatedly monitor the orientation and/or software applications to ensure that the privacy filters 802 are dynamically activated and deactivated based on the changing orientation modes of the electronic system 100 and/or the applications presenting information on the display devices 102, 104.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the IoT using an IoT Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic system comprising:

multiple electronic display devices each including an individually and electronically controllable privacy filter that adjusts opacities of information that is electronically presented on the display device;

one or more sensors operably coupled with the display devices, the one or more sensors configured to detect orientations of the display devices; and a control unit configured to receive a signal from the one or more sensors that indicates the orientations of the display devices that are detected, the control unit configured to identify an orientation mode of the display devices, the control unit configured to activate or deactivate the electronically controllable privacy filters in the display devices to independently polarize and diffract light generated by the display devices at different angles to modify the information presented on the display devices based on the orientation mode.

2. The electronic system of claim 1, wherein the control unit is configured to identify one or more software applications presenting the information on one or more of the display devices, the control unit configured to activate or deactivate the electronically controllable privacy filter in the one or more of the display devices based on the one or more software applications presenting the information on the one or more of the display devices.

3. The electronic system of claim 1, wherein the display devices are dual laptop screens.

4. The electronic system of claim 1, wherein the one or more sensors include a hinge sensor configured to measure an angle between the display devices.

5. The electronic system of claim 1, wherein the one or more sensors include one or more accelerometers configured to measure the orientations of the display devices relative to each other.

6. The electronic system of claim 1, wherein the control unit is configured to identify the orientation mode of the display devices as one or more of a standing vertical orientation mode, a vertical book orientation mode, an extended laptop orientation mode, a condensed laptop orientation mode, a horizontal book orientation mode, or a tent orientation mode.

7. The electronic system of claim 1, wherein the one or more sensors include a camera configured to detect whether an eye level of a user relative to the camera, the control unit configured to identify the orientation mode of the display devices and to activate or deactivate the electronically controllable privacy filters based on the eye level of the user relative to the camera.

8. A method comprising:

detecting orientations of multiple display devices;

identifying an orientation mode of the display devices based on the orientations that are detected; and individually activating or deactivating electronically controllable privacy filters in the display devices to independently polarize and diffract light generated by the display devices at different angles to modify information presented on the display devices based on the orientation mode that is identified.

9. The method of claim 8, further comprising:

identifying one or more software applications presenting the information on one or more of the display devices; and activating or deactivating the electronically controllable privacy filter in the one or more of the display devices based on the one or more software applications presenting the information on the one or more of the display devices.

10. The method of claim 8, wherein the orientations that are detected are orientations of dual laptop screens as the display devices.

11. The method of claim 8, wherein the orientations are detected as an angle between the display devices using a hinge sensor.

12. The method of claim 8, wherein the orientations are detected using one or more accelerometers.

13. The method of claim 8, wherein the orientation mode of the display devices is identified as one or more of a standing vertical orientation mode, a vertical book orientation mode, an extended laptop orientation mode, a condensed laptop orientation mode, a horizontal book orientation mode, or a tent orientation mode.

14. The method of claim 8, wherein the orientations are detected using a camera detecting an eye level of a user relative to the camera, wherein the orientation mode of the display devices is identified, and the electronically controllable privacy filters are activated or deactivated based on the eye level of the user relative to the camera.

15. An electronic system comprising:

display devices each having an electronically controllable privacy filter;

at least one sensor configured to detect orientations of the display devices; and a control unit configured to determine an orientation mode of the display devices and to identify one or more software applications presenting information on at least one of the display devices, the control unit configured to individually activate or deactivate the electronically controlled privacy filter in the at least one of the display devices to polarize and diffract light generated by the electronic display devices at different angles to modify the information presented on the at least one of the display devices, the control unit configured to individually activate or deactivate the electronically controlled privacy filter based on one or more of the orientations of the display devices or the one or more software applications.

16. The electronic system of claim 15, wherein the control unit is configured to individually activate or deactivate the electronically controlled privacy filter based on the orientations of the display devices.

17. The electronic system of claim 15, wherein the control unit is configured to individually activate or deactivate the electronically controlled privacy filter based on the one or more software applications.

18. The electronic system of claim 15, wherein the at least one sensor includes a hinge sensor configured to measure an angle between the display devices as the orientations of the display devices.

19. The electronic system of claim 15, wherein the at least one sensor includes accelerometers configured to measure the orientations of the display devices relative to each other.

20. The electronic system of claim 15, wherein the at least one sensor includes a camera configured to measure the orientations of the display devices based on an eye level of a user of the electronic system.

* * * * *